(12) United States Patent
Wu

(10) Patent No.: US 7,627,341 B2
(45) Date of Patent: Dec. 1, 2009

(54) USER AUTHENTICATION VIA A MOBILE TELEPHONE

(75) Inventor: Peter Wu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 276 days.

(21) Appl. No.: 11/046,908

(22) Filed: Jan. 31, 2005

(65) Prior Publication Data

US 2006/0172700 A1 Aug. 3, 2006

(51) Int. Cl.
*H04M 1/00* (2006.01)

(52) U.S. Cl. .................. 455/556.1; 455/41.2; 455/66.1; 455/420; 455/418; 455/411

(58) Field of Classification Search ................ 455/41.2, 455/556.1, 66.1, 420, 411, 418, 41
See application file for complete search history.

(56) References Cited

U.S. PATENT DOCUMENTS

| | | | |
|---|---|---|---|
| 5,937,038 A * | 8/1999 | Bell et al. ................ 379/93.17 |
| 6,061,338 A * | 5/2000 | O ............................... 370/335 |
| 6,529,742 B1 * | 3/2003 | Yang ....................... 455/556.1 |
| 6,842,621 B2 * | 1/2005 | Labun et al. ............. 455/456.3 |
| 6,892,067 B1 * | 5/2005 | Sharma et al. .............. 455/419 |
| 7,058,356 B2 * | 6/2006 | Slotznick ................... 455/3.05 |
| 7,155,213 B1 * | 12/2006 | Almeda et al. .............. 455/419 |
| 7,283,635 B1 * | 10/2007 | Anderson et al. ............. 381/74 |
| 2002/0052193 A1 * | 5/2002 | Chetty ....................... 455/412 |
| 2003/0048174 A1 * | 3/2003 | Stevens et al. ............. 340/5.64 |
| 2003/0073432 A1 * | 4/2003 | Meade, II .................... 455/420 |
| 2003/0134623 A1 * | 7/2003 | Kanamaru et al. ........... 455/414 |
| 2003/0199267 A1 | 10/2003 | Iwasa et al. |
| 2004/0156320 A1 * | 8/2004 | Hammer et al. ............. 370/252 |
| 2006/0094401 A1 * | 5/2006 | Eastlake, III ................ 455/411 |
| 2008/0109823 A1 * | 5/2008 | Whitfield et al. ............ 719/318 |

FOREIGN PATENT DOCUMENTS

| | | |
|---|---|---|
| CN | 2627765 Y | 7/2004 |
| EP | 1291748 | 3/2003 |
| JP | 8307412 | 11/1996 |
| JP | 2003178272 A | 6/2003 |
| JP | 2003208409 A | 7/2003 |
| WO | WO9949378 | 9/1999 |
| WO | WO0221835 | 3/2002 |

OTHER PUBLICATIONS

Herrera-Joancomart, et al., "A Personal authentication scheme using mobile technology", Information Technology: Coding and Computing (computers and communications) 2003, Piscataway, NJ, USA, IEEE, Apr. 28, 2003, pp. 253-257.

* cited by examiner

*Primary Examiner*—Yuwen Pan
(74) *Attorney, Agent, or Firm*—Lee & Hayes, PLLC

(57) ABSTRACT

A mobile telephone automatically establishes communication with a system via a short-range wireless network. When communication is established, the mobile telephone user is automatically logged in to the system. The system can then apply personalized settings and/or provide access to personalized services based on the mobile telephone user's system account. Once communication between the mobile telephone and the system is established, the mobile telephone may be used as a remote control device to control operation of the system.

16 Claims, 5 Drawing Sheets

USER AUTHENTICATION VIA A MOBILE TELEPHONE

TECHNICAL FIELD

This invention relates to entertainment and/or information systems, and more specifically to using a mobile telephone to authenticate a user of an entertainment and/or information system.

BACKGROUND

With technological advances, entertainment systems are becoming more sophisticated. For example, watching television originated as a passive activity, where a television set was simply tuned into a particular channel and the viewer watched whatever program was currently being broadcast. Now, with digital television, interactive and/or personalized services can be accessed via a television as well. For example, a television advertisement may include a link that can be selected to launch an application (e.g., a Web site, a digital video recorder scheduling application, etc.).

Personalized services provide another level of sophistication that can be implemented within an entertainment system. A favorite channel list is one example of such a personalized service. Some entertainment systems, such as a television with a digital cable television receiver that is configured to also provide Internet access may also provide access to Internet-based personalized services. Personalized services are common via the Internet, examples of which may include my.msn.com, my.yahoo.com, etc., but may also be provided, for example, by a cable television operator. Personalized services are typically associated with a particular user, which corresponds to an individual's Internet account. Such accounts are typically not shared among multiple individuals, so personalizing services based on an individual Internet account works well.

Enabling access to such personalized services via a television based system, however, poses a problem. Televisions are typically shared by several people within a household. Because television systems typically don't require a user to login to an account, it is more difficult to access personalized services via a shared television system.

One solution may be to require that a television viewer login so that a specific television viewer can be determined. Login on a personal computer is easy with a keyboard, and inputs can be easily masked to provide a level of security. Login via a television remote control device is much more difficult because of the limited number of available input buttons. Furthermore, masking the input is more difficult than via a computer-based user interface. Schemes for entering alphabetic characters and symbols such as on-screen keyboards and triple-tap typing involve showing the characters on screen so that the user can choose which character to add, which prevents effective character masking and allows others watching the television display to see the characters being entered. If logging into a television-based personal account is difficult, viewers will be much less likely to utilize personalized services that may be available through television viewing.

Accordingly, a need exists for an easier, secure way to authenticate a single user of an entertainment system so that personalized data can be presented via the entertainment system.

SUMMARY

User authentication via a mobile telephone is described herein.

In an implementation of user authentication via a mobile telephone, a system and a mobile telephone each include a short-range wireless network interface. When the mobile telephone is brought physically within range of the system, the mobile telephone automatically transmits a security key to the system via the short range wireless network. When the security key is verified, a system user account associated with the owner of the mobile phone is activated such that the system can apply personalized settings and/or allow access to personalized services.

In another implementation of user authentication via a mobile telephone, once the owner of the cell phone is logged in to the system, the cell phone may be used as a remote control device to interact with the system.

BRIEF DESCRIPTION OF THE DRAWINGS

The same numbers are used throughout the drawings to reference like features and components.

DETAILED DESCRIPTION

The following discussion is directed to user authentication via a mobile telephone. In an embodiment, a television set-top box is configured to receive authentication data from a mobile telephone (also referred to herein as a cellular telephone or cell phone). The television set-top box uses the received authentication data to automatically authenticate the owner of the cell phone as the current television viewer for purposes of applying personalized settings and/or providing access to personalized services.

Cell phones have become very affordable and commonplace within our society. An individual who owns a cell phone typically carries the cell phone with them nearly all of the time, as they would typically carry a purse or wallet. Therefore, it is convenient for an individual to use their cell phone to authenticate themselves on a home entertainment system. Using a cell phone is more convenient than using an entirely new device for this purpose because cell phones are already widely deployed and individuals are already accustomed to keeping their cell phones secure and close at hand. Furthermore, many cell phones are configured to be used with other devices, such as to download email messages from a personal computer to a cell phone. Because cell phones are typically not shared among individuals, and because they are designed to transmit and receive data, cell phones can be used to automatically authenticate a particular individual to an entertainment and/or information system. Furthermore, because cell phones include a numeric keypad and other buttons that are typically used to navigate a menu system, a cell phone may also be used as a remote control device for an entertainment and/or information system.

While aspects of the systems and methods described for user authentication via a mobile telephone can be implemented in any number of different computing systems, environments, and/or configurations, embodiments of user authentication via a mobile telephone are described in the context of the following exemplary system architectures.

Figure 1:
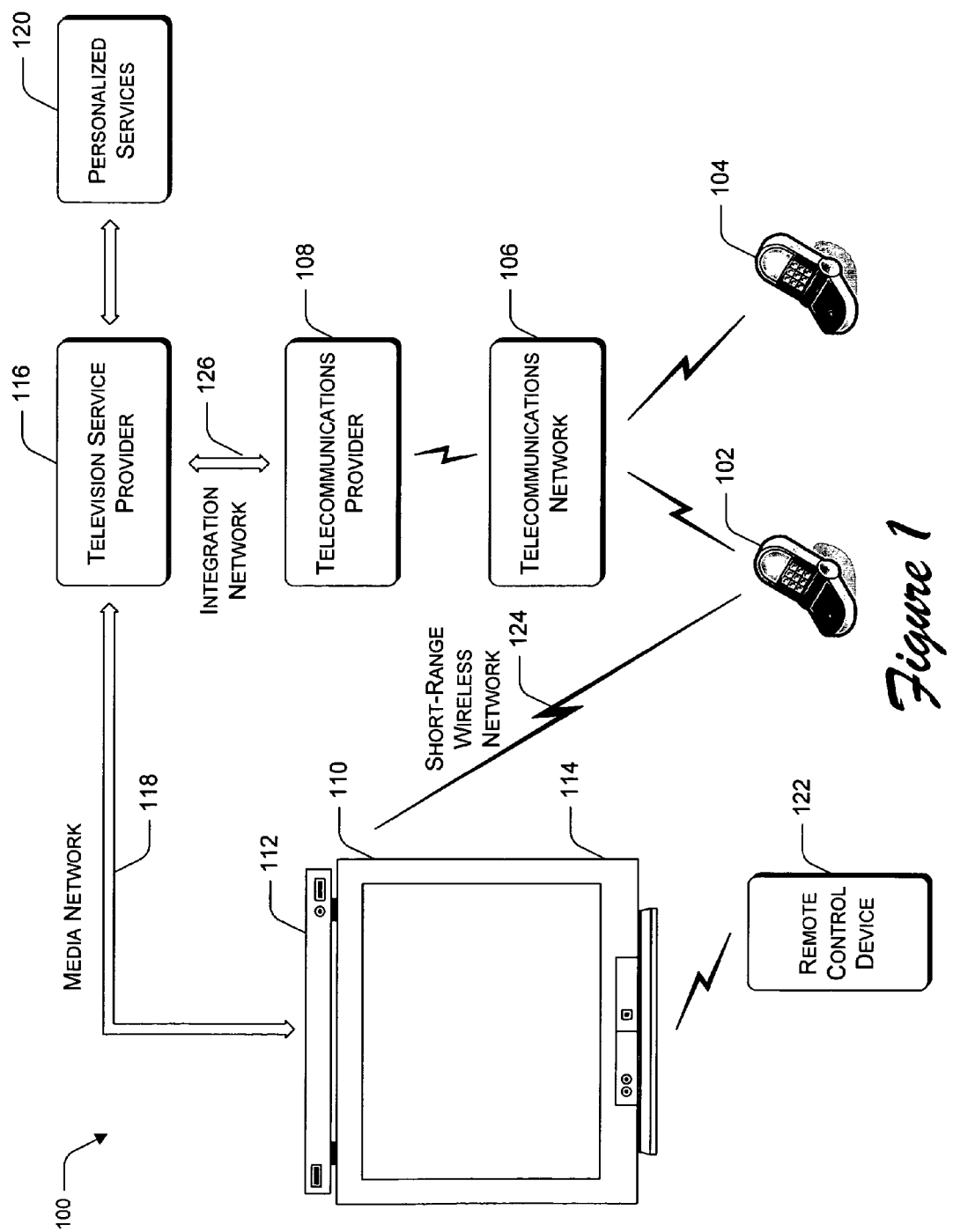
FIG. 1 is a pictorial diagram illustrating an exemplary environment in which user authentication via a mobile telephone may be implemented.

FIG. 1 illustrates an exemplary environment 100 in which a cell phone may be used to automatically authenticate a particular user of an entertainment system. Environment 100 includes cell phones 102 and 104 which communicate via telecommunications network 106. Telecommunications network 106 may include, for example, any number of transmission towers via which wireless communications are transmitted.

Telecommunications provider 108 may also have access to telecommunications network 106. Telecommunications provider 108 is representative of, for example, one or more server computer systems associated with a wireless communications provider (e.g., Sprint, Verizon, Cingular, etc.), and is configured to maintain data associated with subscribers to services offered by the telecommunications provider. For example, when an individual purchases cellular telephone service from a wireless communications provider, an account is maintained by telecommunications provider 108. The account typically includes billing information associated with the individual, a serial number of the cell phone associated with the account, and subscription information that indicates any additional services that have been purchased (e.g., call waiting, text messaging, etc.). When the individual makes a call using the cell phone, the serial number of the cell phone is transmitted to telecommunications provider 108 via telecommunications network 106, to enable the telecommunications provider 108 to bill the individual's account for the call that is being made.

Exemplary entertainment system 110 includes a client device 112 and a television or other display device 114. Client device 112 is representative of a cable television set-top box, a satellite television receiver, or other such device configured to receive subscription media content. Client device 112 is compatible with a subscription media content service offered by television service provider 116. Client device 112 may be provided by television service provider 116 on a purchase or rental basis. Alternatively, client device 112 may be purchased, for example, in a retail store or be configured as an integrated component of another consumer electronic device such as a DVD player or display device 114.

Client device 112 receives media content from television service provider 116 via media network 118. Television service provider 116 is representative of, for example, a cable television system headend, a satellite television service provider, or other such entity. Client device 112 provides media content to a user via display device 114 by tuning to a particular channel. A channel may be a channel over which broadcast or video-on-demand media content is available, or a channel may be associated with locally stored media content, such as pre-recorded media content, photos, home videos, and so on. Television service provider 116 may also provide access to personalized services 120, which may be hosted by television service provider 116 or may be hosted by an external partner.

Remote control device 122 is configured to transmit commands to client device 112. For example, a user may change the channel to which the client device is tuned by pressing a channel up or channel down button or by entering a specific channel number using the number buttons. Remote control device 122 may also be used to navigate an interactive menu system provided by client device 112.

In the illustrated example, cell phone 102 can be positioned proximate to client device 112 such that cell phone 102 becomes aware of short-range wireless network 124, which is associated with client device 112. IEEE 802.15 (Bluetooth) is one example of an inexpensive, portable, secure, and widely deployed short range wireless networking technology that may be used to implement short-range wireless network 124. In an exemplary implementation, cell phone 102 transmits a serial number associated with cell phone 102 to client device 112. In an exemplary implementation, the serial number may be combined with other information specific to the cell phone and encrypted to prevent other devices from being able to pretend to be that cell phone (i.e. spoof the cell phone). Further, the serial number that is transmitted to client device 112 can be the same serial number that is transmitted to telecommunications operator 108 when a phone call is placed from cell phone 102. Client device 112 then identifies the individual who owns the cell phone (and is assumed to be using the cell phone) based on the received serial number. The individual's identity is then used to apply personal settings and/or to provide access to personalized services via entertainment system 110.

The individual's identity may be determined based on data maintained by client device 112 as a result of a previous communication between client device 112 and cell phone 102. Alternatively, client device 112 may forward the received serial number to television service provider 116, which then communicates with telecommunications operator 108 over integration network 126 to identify and authenticate the cell phone owner. Integration with telecommunications provider 108 is optional and may be done in scenarios where television service provider 116 wants to enforce that the individual is a subscriber with a particular telecommunications provider before allowing them to use the service. Integration may also be useful in scenarios where telecommunications provider 108 wants to track usage of the service for billing and/or marketing purposes.

After the cell phone owner has been identified and authenticated, client device 112 automatically performs a login process to identify the cell phone owner as the current user of entertainment system 110. This enables entertainment system 110 to present media content according to personalized settings associated with the cell phone owner's entertainment system account, and to provide access to personalized services. Each personalized service may require its own user authentication, in which case television service provider 116 could map an authenticated user to a personalized service user ID.

In an exemplary implementation, data identifying the cell phone (e.g., the cell phone serial number) may be transmitted from client device 112 to telecommunications provider 108 via television service provider 116 to enable television service provider 116 and/or telecommunications provider 108 to bill for the interaction between the cell phone 102 and entertainment system 110 on a per-use basis.

In an exemplary implementation, after the cell phone owner is successfully logged in as the current user of entertainment system 110, cell phone 102 may be used as a remote control device similar to remote control device 122. For example, a user may change the channel to which the client device is tuned by entering a channel number using the number keys on the cell phone. Alternatively, up and down arrow keys that are typically used on a cell phone for menu navigation may be used to change channels in a manner similar to the use of a channel up and channel down button on remote control device 122. The user may stay logged in until either the wireless connection is broken by the cell phone being moved out of range of the entertainment system, or after a certain period of inactivity (e.g., a time out period).

In an exemplary implementation, cell phone 102 includes a "Phone/TV" button and/or menu item that can be selected by a user to specify a mode for the cell phone. For example, when in the "Phone" mode, the cell phone operates as a typical cell phone; when in the "TV" mode, the cell phone operates as a remote control device such that each button press causes a command to be sent to client device 112 via short-range wireless network 124.

Although illustrated and described within the context of an entertainment system, it is recognized that user authentication via a mobile telephone may be implemented for various types of entertainment and/or information systems. For example, an automobile information system may be configured to receive data from a mobile telephone to automatically determine the identity of the driver and subsequently adjust personalized settings within the automobile, such as seat position, thermostat settings, and radio stations. User authentication via a mobile telephone as described herein may be implemented for any type of system to which a user may log in.

Furthermore, mobile telephones can come in various forms including phones that are integrated with other functionality, such as pagers, digital cameras, portable audio players, portable video players, portable gaming devices, and personal digital assistants with note taking, email, instant messaging, text messaging, multimedia messaging, contacts list, and calendar features.

Using the cell phone makes it easier for each individual in the household to access personalized services on entertainment system. Even after one individual in the household has used their cell phone to access personalized services on the entertainment system, another individual in the household can use their cell phone to easily switch users and access their personalized services on the entertainment system.

By making it easier for users to access personalized services via the entertainment system, television providers also benefit by being able to track usage on a personal level rather than household level. Different individuals in a household may have different tastes and different usage patterns. By tracking usage for each individual separately, television providers can more effectively target marketing and advertisements to individuals.

In the described exemplary implementation, communication between cell phone 102 and entertainment system 110 is performed via short range wireless network 124, rather than via telecommunications network 106. There are a number of advantages to this approach: (1) communications via short range wireless network 124 do not consume bandwidth on telecommunications network 106, and do not deduct from the cell phone's subscription air time; (2) good reception of telecommunications network 106 is not required; (3) there is lower latency when communicating directly with the entertainment system as compared with communicating via a telecommunications network; and (4) an additional level of security is introduced by requiring the cell phone to be within a physical vicinity of the entertainment system, as defined by the range of short range wireless network 124. Furthermore, the use of a short range wireless network does not impose any inconvenience on the individual. The individual will likely be within viewing distance of the entertainment system in order to benefit from the services presented on the television screen, so the individual will likely be within range of the wireless connection as well. Use of wireless technology makes the experience much more convenient for the individual than requiring a wired connection; it is similar to the experience users are already accustomed to with handheld remote control devices for entertainment systems, such as remote control device 122.

Figure 2:
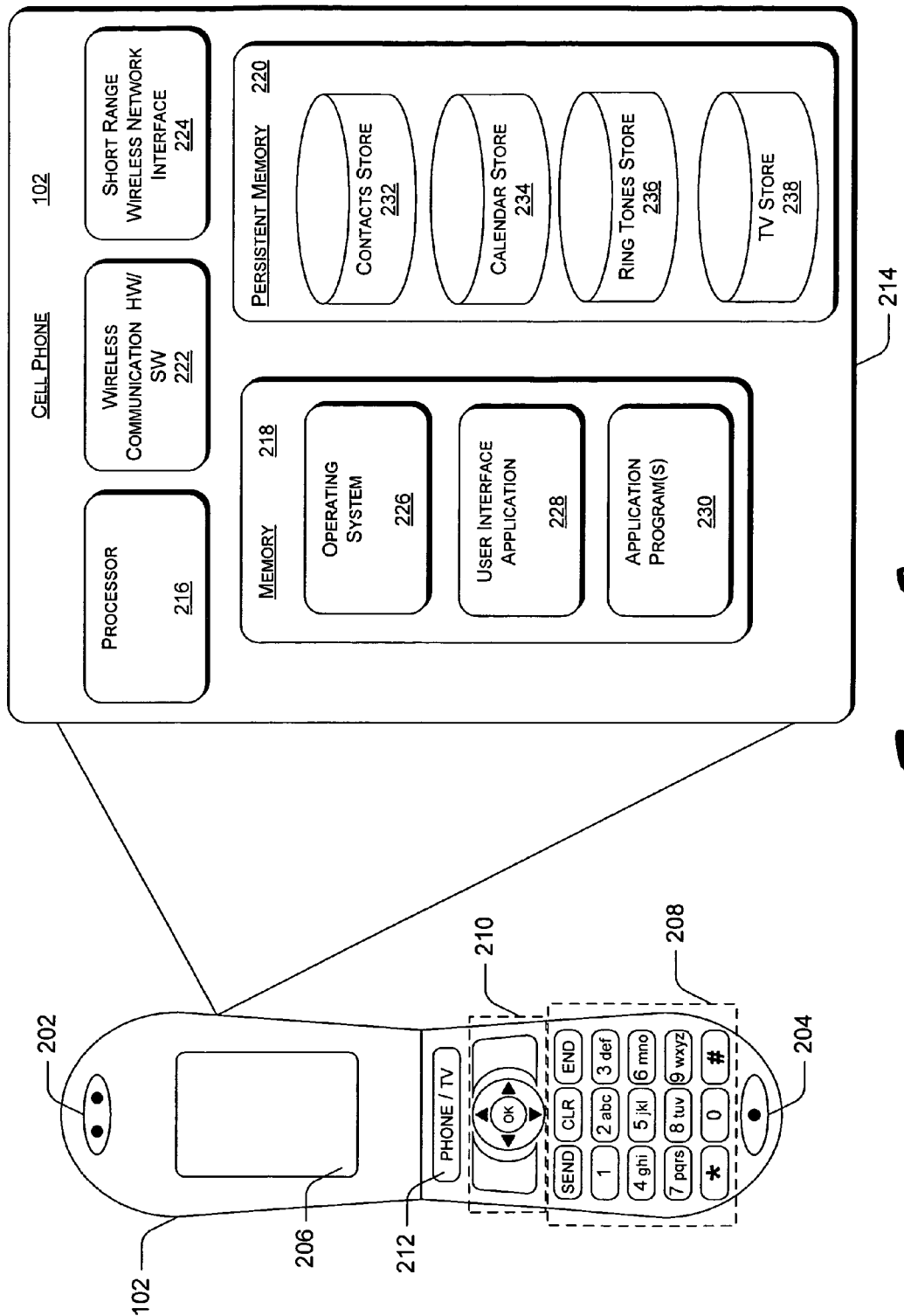
FIG. 2 is a block diagram illustrating selected components of an exemplary mobile telephone.

FIG. 2 illustrates select components of an exemplary cellular telephone 102 configured to interact with an entertainment and/or information system to automatically authenticate a user of the system. The physical interface of cell phone 102 includes an earpiece 202, a mouthpiece 204, a display 206, a keypad 208, menu navigation buttons 210, and mode selection button 212. Mode selection button 212 is used to toggle the cell phone between a phone mode, in which the phone behaves as a typical cell phone, and a TV mode, in which the phone behaves as a remote control for the entertainment and/or information system. When in TV mode, any button presses on the cell phone are transmitted to the system, and are interpreted as commands from a remote control device. These commands may include, but are not limited to, channel change commands (via numbers or up and down arrows) and system user interface navigation commands.

Block 214 illustrates select components of exemplary cell phone 102. Exemplary cell phone 102 includes a processor 216, memory 218, persistent memory 220, wireless communication hardware and software 222, and short range wireless network interface 224.

Wireless communication hardware and software 222 includes components typically found in mobile telephones that enable the phone to communicate via a wireless telecommunications network. Short range wireless network interface 224 is configured to enable communication between cell phone 102 and an entertainment and/or information system via a short range wireless network.

Operating system 226, user interface application 228, and one or more other application programs 230 are stored in memory 218 and executed on processor 216. These components enable user interaction with cell phone 102, for example, to place and receive phone calls, manage contact data, play games, and so on.

Data stored in persistent memory may include, but is not limited to, contacts data (e.g., names and phone numbers) maintained in contacts store 232, calendar data (e.g., daily schedules) maintained in calendar store 234, ring tones (e.g., different melodies and/or sounds that can be selected to indicate an incoming phone call) maintained in ring tones store 236, and television data (e.g., entertainment system IDs and associated keys) maintained in TV store 238.

Figure 3:
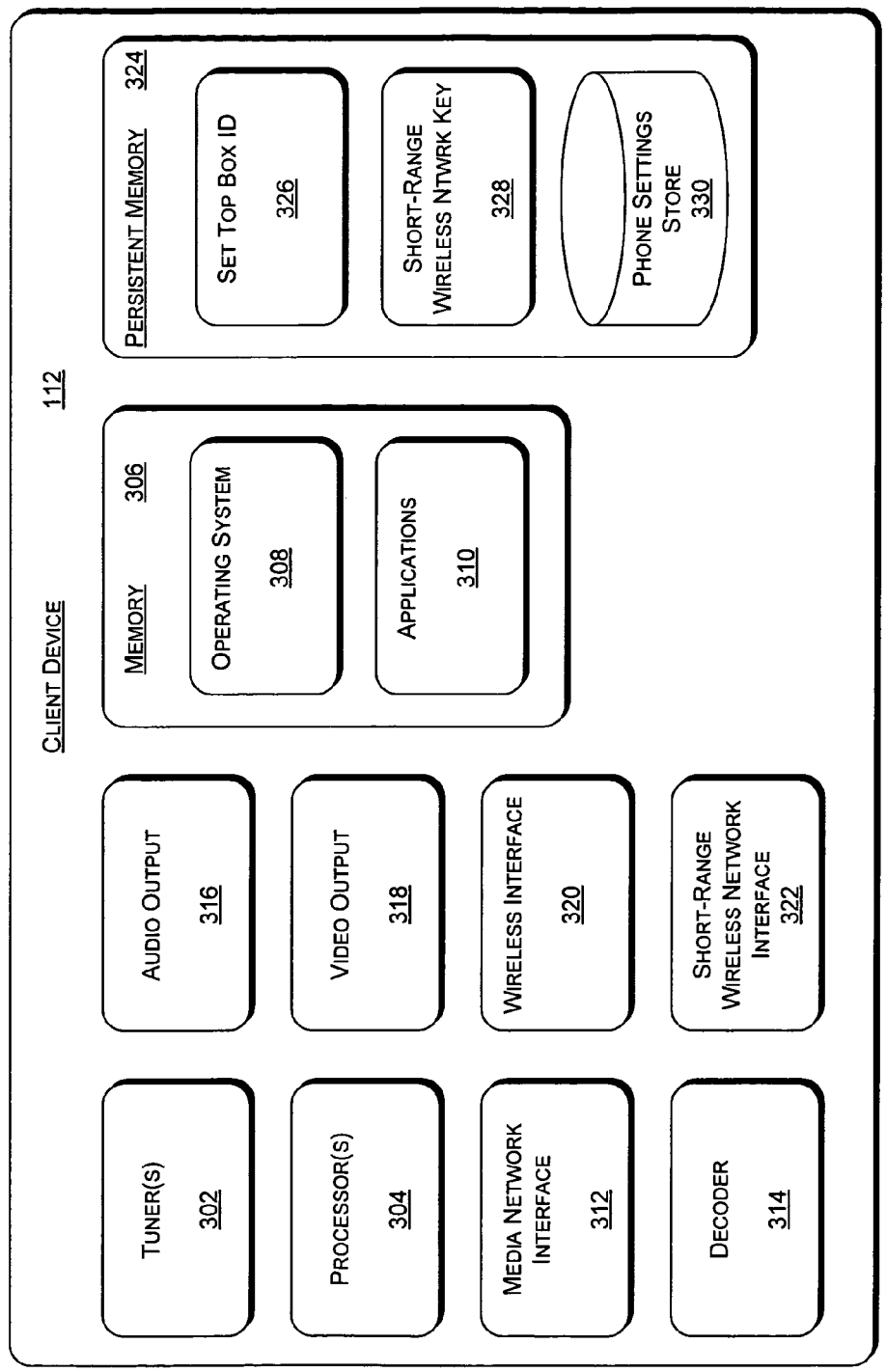
FIG. 3 is a block diagram illustrating selected components of an exemplary television set-top box.

FIG. 3 illustrates select components of exemplary client device 112 implemented as part of an entertainment system. Client device 112 includes one or more tuners 302, one or more processors 304, and memory 306. Tuners 302 are representative of specialized hardware and/or software that is configured to access various channels over which media content may be available. For example, traditional broadcast channels may be accessed via a hardware tuner, while a software component may be used to tune to channels that are available over an IP network.

Operating system 308 and one or more applications 310 are stored in memory 306 and executed on processor 304. Applications 310 may include, for example, an electronic program guide application for displaying upcoming scheduled programs.

Client device 112 also includes media network interface 312, decoder 314, audio output 316, video output 318, wireless interface 320, and short-range wireless network interface 322.

Media network interface 312 is configured to enable communication between client device 112 and television service provider 116 via media network 118 (shown in FIG. 1). Communication between client device 112 and television service provider 116 may be utilized to receive media content and other data from television service provider 116 and to request authentication of a particular user based on a cell phone serial number.

Decoder 314 is configured to decode media content and data received via media network 118 so that it can be displayed and/or otherwise utilized. Audio output 316 and video output 318 enable audio/visual media content to be presented to a user.

Wireless interface 320 enables client device 112 to receive commands from a remote control device (e.g., remote control device 122 shown in FIG. 1). In an exemplary implementation, wireless interface 320 is implemented as an infrared receiver.

Short-range wireless network interface 322 enables client device 112 to receive communicate with a device, such as a cellular telephone, via a short-range wireless network. Short-range wireless network interface 322 may be implemented as an internal component of client device 112 or as an external component connected, for example, via a Universal Serial Bus (USB) port. Although not shown in FIG. 3, it is recognized that drivers, protocol layers, and/or application logic associated with short range wireless network interface 322 may also be implemented as part of client device 112.

Client device 112 also includes persistent memory 324, in which a set-top box identifier 326 and short-range wireless network key 328 are maintained. Persistent memory 324 may also include phone settings store 330 for maintaining data that identifies cell phones that have been authenticated for use as remote control devices for client device 112. Phone settings store 330 may also store additional user profile data for an account associated with a particular cell phone. For example, phone settings store 330 may store client device user preferences and user ID's and passwords associated with available personalized services.

In an alternate implementation, phone settings store 330 may be maintained by television service provider 116 (shown in FIG. 1). For example, a client device with limited memory resources may forward data to the television service provider 116 for storage.

Methods for user authentication via a mobile telephone, such as exemplary method 400 described with reference to FIG. 4 and exemplary method 500 described with reference to FIG. 5, may be described in the general context of computer executable instructions. Generally, computer executable instructions include routines, programs, objects, components, data structures, procedures, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 4:
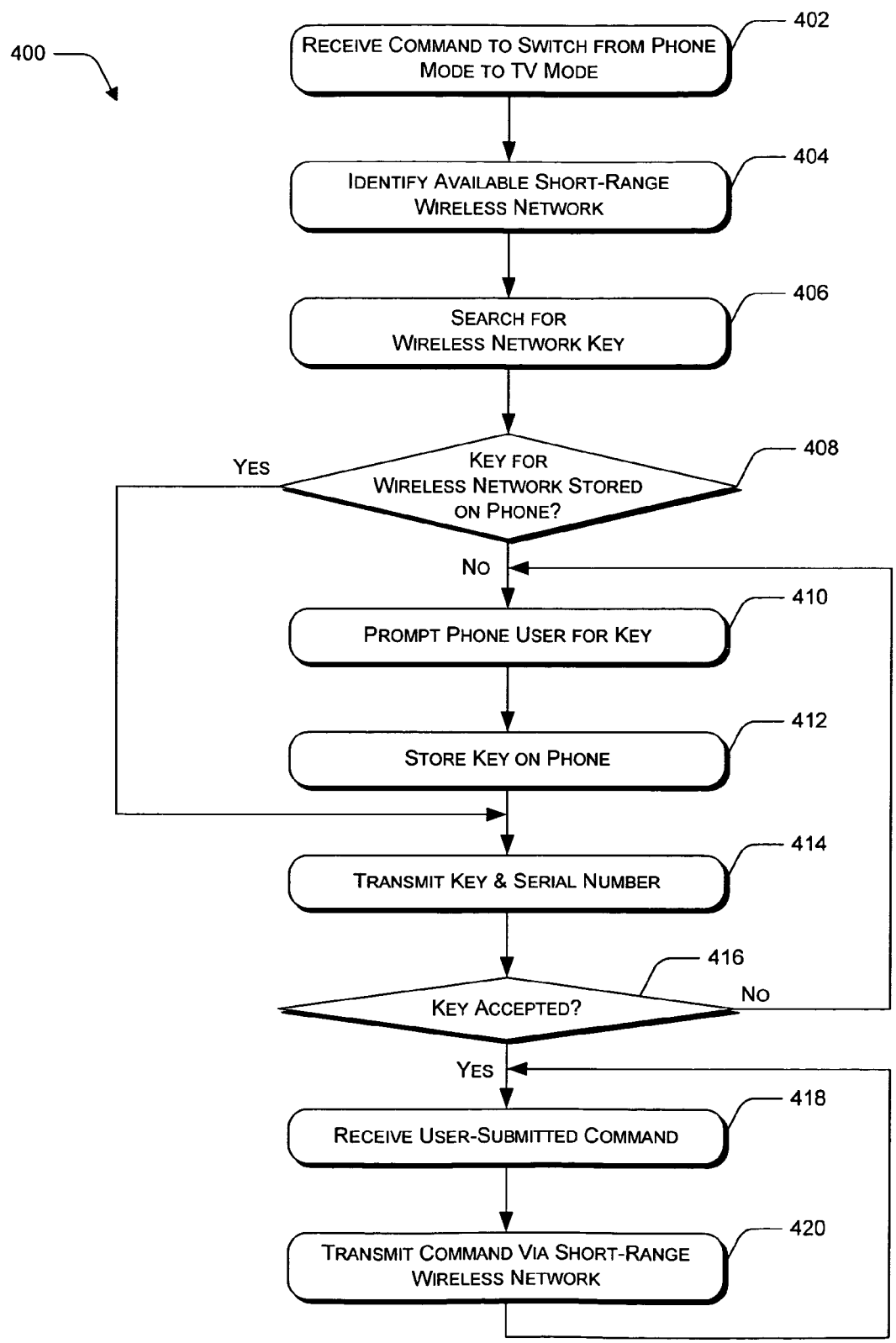
FIG. 4 is a flow diagram of an exemplary method for controlling an entertainment system via a mobile telephone.

FIG. 4 illustrates an exemplary method 400 for using a mobile telephone as a remote control device for an entertainment and/or information system. The order in which the method is described is not intended to be construed as a limitation, and any number of the described method blocks can be combined in any order to implement the method. Furthermore, the method can be implemented in any suitable hardware, software, firmware, or combination thereof.

At block 402, a cellular phone receives a command to switch from a phone mode to a system mode. In the illustrated example, the cell phone is configured to communicate with an entertainment system. Accordingly, the system mode is referred to as a TV mode. For example, a cell phone user may press a phone/TV mode selection button, such as mode selection button 212, shown in FIG. 2. Alternatively, a user may select a TV mode via a menu system that is provided as part of the cell phone's user interface.

At block 404, the cell phone identifies an available short-range wireless network. For example, when placed in TV mode, the cell phone begins searching for a wireless network. This is similar to a laptop computer that is able to locate a wireless network that is available, for example, in an airport or other public place. In an alternate implementation, the cell phone automatically switches to TV mode when it detects an available short-range wireless network.

At block 406, the cell phone searches data stored on the cell phone for a key associated with the identified wireless network. For example, in an exemplary implementation, the data that identifies an available wireless network includes an identifier that is associated with the network, and an indication that a security key is required to enable access to the wireless network. In the described exemplary implementation, the cell phone searches TV store 238 (shown in FIG. 2) for a key that is associated with the identified wireless network.

At block 408, the cell phone determines whether or not a key associated with the identified wireless network is stored on the phone. If a key is found (the "Yes" branch from block 408), then processing continues as described below with reference to block 414. If a key is not found (the "No" branch from block 408), then at block 410, the cell phone prompts a user to enter a key. For example, if the owner of the cell phone is visiting a friend, and wishes to control the friend's entertainment system, the cell phone owner must first enter a key associated with the entertainment system wireless network. In an exemplary implementation, the key may be configurable by the owner of the entertainment system via an entertainment system user interface. The owner of the entertainment system can then provide the key to anyone they wish. The cell phone user enters the key via the cell phone keypad 208 (shown in FIG. 2).

At block 412, the cell phone stores the key in association with the wireless network identifier. For example, the key is added to TV store 238, shown in FIG. 2.

At block 414, the cell phone transmits the key and a serial number associated with the cell phone to the entertainment system via the short-range wireless network.

At block 416, the cell phone determines whether or not the transmitted key was accepted. For example, if an error message is received in response to transmitting the key, it may be determined that the key was not accepted; if no error message is received, it may be determined that the key was accepted. If the key is not accepted (the "No" branch from block 416), then processing continues as described above with reference to block 410, with the user being prompted to enter a key.

For example, if you tell your neighbor your network key so that he can use his cell phone with your set-top box, but later decide that you no longer want him to have access, you could change the network key on your set-top box, update the network key on your cell phone, but not tell your neighbor what your new network key is. When your neighbor tries to use his cell phone with your set-top box using the old network key stored in his cell phone, your set-top box will not accept the old network key and he will be prompted to enter the new network key before gaining access to your set-top box.

At block 418, when the transmitted key is accepted (the "Yes" branch from block 416), the cell phone receives a user-submitted command. For example, a user may press an up or down arrow button or a number button on the cell phone.

At block 420, the cell phone transmits the user-submitted command to the entertainment system via the short-range wireless network. For example, if a user pressed an up button on the cell phone, a channel change up command may be transmitted from the cell phone to the entertainment system via the short-range wireless network.

In an exemplary implementation, the cell phone automatically toggles back to "Phone" mode if an incoming telephone call is detected. Alternatively, a user may be able to customize such behavior via a menu system, for example, to direct the cell phone to automatically direct incoming calls to a voice mail system while the phone is in "TV" mode, or to automatically switch the phone back to "Phone" mode after a predetermined amount of time.

Figure 5:
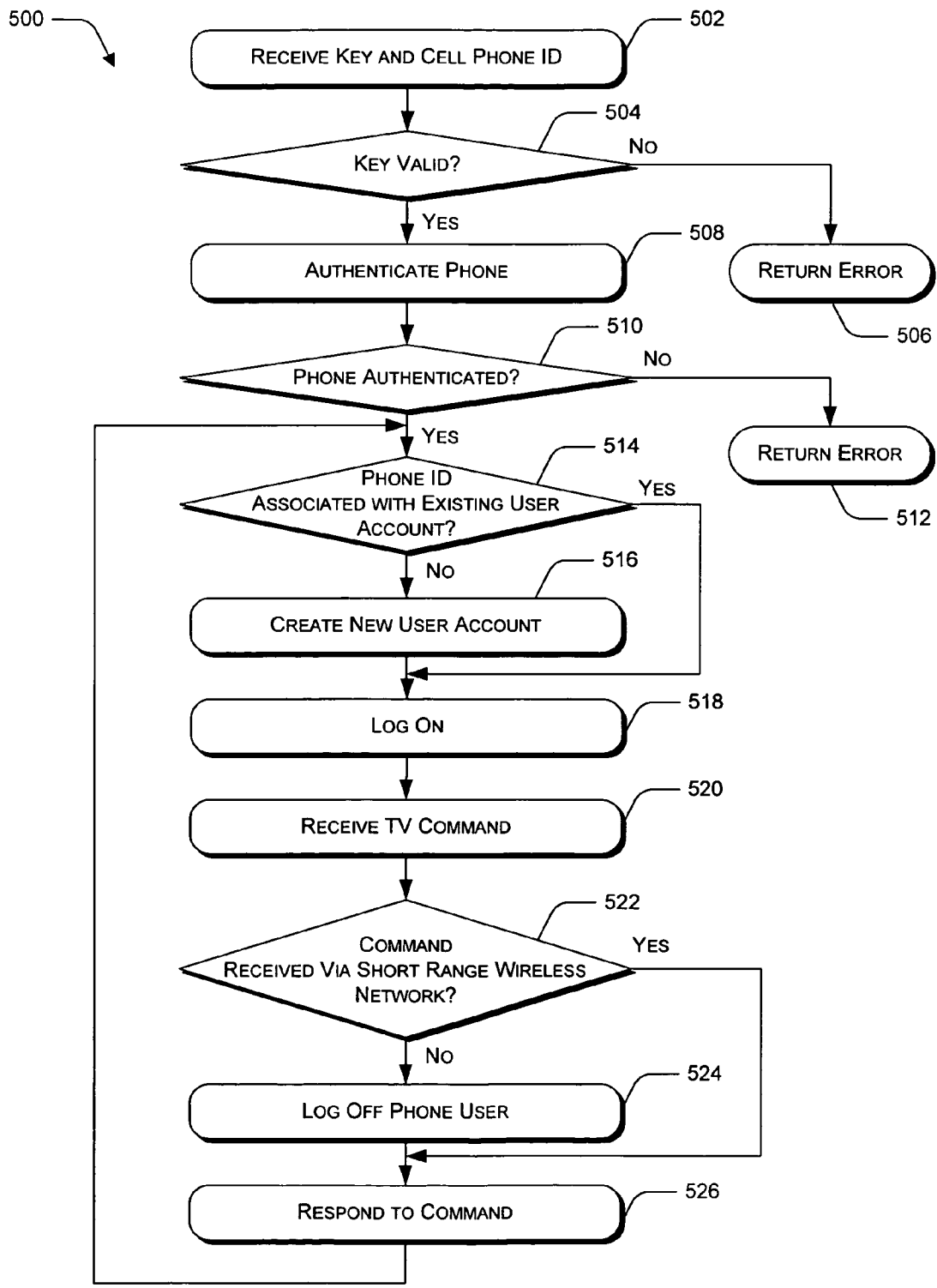
FIG. 5 is a flow diagram of an exemplary method for authenticating a user of an entertainment system based on data received from a mobile telephone.

FIG. 5 illustrates an exemplary method 500 for authenticating a user of a system based on data received from a cell phone via a short-range wireless network. The order in which the method is described is not intended to be construed as a limitation, and any number of the described method blocks can be combined in any order to implement the method. Furthermore, the method can be implemented in any suitable hardware, software, firmware, or combination thereof. FIG. 5 is described in the context of an entertainment system, but it is recognized that user authentication via a mobile telephone may be utilized with various types of entertainment and/or information systems.

At block 502, an entertainment system receives a key and a cell phone ID via a short-range wireless network. For example, when exemplary cell phone 102 (shown in FIG. 1) is put into a TV mode and brought within range of entertainment system 110, the cell phone automatically transmits to client device 112 via short-range wireless network 124 a security key and an identifier that uniquely identifies the cell phone (e.g., a cell phone serial number). As described above with reference to FIG. 4, the security key may be stored in cell phone 102, or if this is the first time cell phone 102 has attempted to communicate with client device 112, then the cell phone user may have been prompted for and entered the security key via the cell phone interface.

At block 504, the entertainment system determines whether or not the entered key is valid. The received key is compared to a key associated with the entertainment system to determine if the cell phone transmitted the correct key. Depending on the implementation, the submitted key may be a single key that is compared to a single key associated with the entertainment system, or the submitted key may be part of a public/private key pair. It is recognized that any number of security implementations may be supported by such a system.

If it is determined that the entered key is not valid (the "No" branch from block 504), then at block 506, the entertainment system generates an error message. In an exemplary implementation, the error message may be displayed on the television screen (e.g., display device 114 in FIG. 1) and/or transmitted to cell phone over the short-range wireless network.

If it is determined that the entered key is valid (the "Yes" branch from block 504), then at block 508, the entertainment system authenticates the phone. In an exemplary implementation, phone settings store 330 (shown in FIG. 3) may include a cell phone ID associated with each cell phone that has been previously authorized to communicate with the entertainment system via the short-range wireless network. If the received cell phone ID is found in phone settings store 330, then the phone is automatically authenticated, and the phone can be used as a remote control device to control the entertainment system.

On the other hand, if the received cell phone ID is not found in phone settings store 330, then additional processing may be performed. In an exemplary implementation, the received cell phone ID may be simply added to the phone settings store 330. In an alternate implementation, client device 112 may transmit the cell phone ID to television service provider 116, requesting authentication. Television service provider 116 may then request authentication of the cell phone from telecommunications provider 108. Telecommunications provider 108 may then return data that indicates whether or not the phone is authenticated based, for example, on whether or not an active subscription is associated with the cell phone (e.g., the cell phone is in service) and/or that the cell phone owner has purchased a subscription that includes support for the television remote control capabilities of the cell phone.

At block 510, the entertainment system determines whether or not the cell phone was successfully authenticated. If the cell phone is not successfully authenticated (the "No" branch from block 510), then at block 512, the entertainment system generates an error message, which again, may be presented via a display device associated with the entertainment system and/or may be transmitted to the cell phone via the short-range wireless network.

If the cell phone is successfully authenticated (the "Yes" branch from block 510), then processing continues at block 514.

At block 514, the entertainment system determines whether or not the received cell phone ID is associated with an existing user account. For example, the entertainment system may query phone setting store 330 based on the received cell phone ID to identify an existing user account. If the received cell phone ID is associated with an existing user account, then at block 518, that user account is logged in.

On the other hand, if the received cell phone ID is not associated with an existing user account, then at block 516, a new entertainment system user account is created. In an exemplary implementation, this is done via a user interface provided by the entertainment system. The new user account is then logged on at block 518.

At block 520, the entertainment system receives a command. For example, a user may enter a channel change command from the cell phone or from a remote control device associated with the entertainment system.

At block 522, the entertainment system determines whether the command was received via the short-range wireless network. If the command was received via the short range wireless network (the "Yes" branch from block 522), then at block 526, the entertainment system responds to the command (e.g., changes the channel if the received command indicates such).

On the other hand, if the command was not received via the short range wireless network (e.g., the command was received via an RF transmission from remote control device 122 shown in FIG. 1), then at block 524, the current user of the entertainment system (i.e., the owner of the cell phone) is logged off, and at block 526, the entertainment system responds to the received command.

In an exemplary implementation, the current user of the entertainment system may also be logged off if the short-range wireless network connection between the entertainment system and the cell phone is broken (e.g., the cell phone is taken out of range of the short-range wireless network).

Furthermore, the current user may be logged off after a predetermined period of inactivity. Such a time period may be configured, for example, through a user interface provided by the entertainment system.

Although embodiments of user authentication via a mobile telephone have been described in language specific to structural features and/or methods, it is to be understood that the subject of the appended claims is not necessarily limited to the specific features or methods described. Rather, the specific features and methods are disclosed as exemplary implementations of user authentication via a mobile telephone.

The invention claimed is:

1. A method to authenticate a user via a mobile phone, the method comprising:
   identifying a short-range wireless network associated with a television entertainment system, the television entertainment system comprising one or more user accounts;
   switching the mobile phone from a mobile phone mode to a television entertainment system mode, wherein:
      when in the mobile phone mode, commands submitted via the phone are interpreted as phone commands; and
      when in the television entertainment system mode, commands submitted via the phone are forwarded via the short-range wireless network to the television entertainment system;
   when an incoming call is detected, toggling from the television entertainment system mode to the mobile phone mode, wherein the mode of the mobile phone being customizable via a menu system at a user interface, wherein via the menu system the mobile phone is customizable to automatically direct incoming calls to a voicemail system and automatically switch the phone back to mobile phone mode after a predetermined amount of time;
   transmitting to the television entertainment system, via the short-range wireless network, an identifier associated with the mobile phone, thereby causing a particular one of the user accounts to be activated, wherein the one or more user accounts include user profile data, wherein the user profile data includes a usage pattern, a user preference, a user ID, and a password;
   tracking the user profile data, wherein the user profile data is communicated to a media content provider;
   storing additional user profile data associated with a personalized service;
   applying personalized settings based on the user profile data;
   providing access to personalized services based on the user profile data;
   displaying a message concerning an authentication status at the television entertainment system; and
   displaying the user interface at the television entertainment system for creating a new user account.

2. The method as recited in claim 1, further comprising transmitting to the television entertainment system, via the short-range wireless network, a security key associated with the television entertainment system.

3. The method as recited in claim 2, wherein transmitting the security key comprises:
   determining a system identifier associated with the short-range wireless network;
   determining the security key as a previously used security key associated with the system identifier; and
   automatically transmitting the security key via the short-range wireless network.

4. The method as recited in claim 2, wherein transmitting the security key comprises:
   prompting a user to enter the security key; and
   transmitting a user-submitted security key via the short-range wireless network.

5. The method as recited in claim 4, further comprising:
   determining a system identifier associated with the short-range wireless network; and
   maintaining the user-submitted key in association with the system identifier.

6. The method as recited in claim 1, further comprising:
   receiving a user-submitted command; and
   transmitting the user-submitted command to the television entertainment system via the short-range wireless network.

7. The method as recited in claim 6 wherein the user-submitted command comprises a channel change command.

8. The method as recited in claim 1, further comprising:
   detecting an incoming telephone call;
   switching the mobile phone from the television entertainment system mode to the mobile phone mode; and
   receiving the incoming telephone call via a wireless telecommunications network.

9. The method as recited in claim 8, further comprising, in response to detecting the incoming telephone call, transmitting a command to the television entertainment system that causes the particular one of the user accounts to be deactivated.

10. A cellular telephone configured to implement the method as recited in claim 1.

11. One or more computer-readable media comprising computer-executable instructions that, when executed, direct a television entertainment system to perform acts comprising:
   publish a system identifier via a short-range wireless network;
   receive, from a mobile telephone, a security key and a mobile telephone identifier via the short-range wireless network;
   authenticate the security key;
   identify a user ID based on the mobile telephone identifier thereby causing a user account to be activated, wherein the user account includes user profile data, wherein the user profile data includes a usage pattern, a user preference, and a password;
   request authentication of the mobile telephone identifier from a telecommunications provider;
   receive confirmation data, from the telecommunications provider, indicating that there is an active subscription associated with the mobile telephone identifier, wherein the active subscription includes telecommunications service and support for television entertainment system control capabilities of the mobile telephone;
   responsive to the confirmation data from the telecommunications provider, perform a login process using the user ID to automatically login a user associated with the television entertainment system, the television entertainment system comprising one or more user accounts;
   switch the mobile telephone from a mobile telephone mode to a television entertainment system mode, wherein when in the television entertainment system mode commands submitted via the mobile telephone are forwarded via the short-range wireless network to the television entertainment system, wherein when an incoming call is detected when in the television entertainment system mode, toggling the mobile telephone from the television entertainment system mode to a mobile telephone mode, and wherein the mobile phone switches to automatically direct an incoming call to a voicemail system and automatically switches to the mobile telephone phone mode after a predetermined amount of time of no activity;

track the user profile data, wherein the user profile data is communicated to a media content provider;

store user profile data associated with a personalized service;

apply a personalized setting based on the user profile data;

provide access to a personalized service based on the user profile data;

display a message concerning an authentication status at the television entertainment system; and display a user interface at the television entertainment system for creating a new user account.

12. The one or more computer-readable media as recited in claim 11, further comprising computer-executable instructions that, when executed, direct the television entertainment system to authenticate the mobile telephone identifier by:

searching a television entertainment system data store; and finding the mobile telephone identifier in the television entertainment system data store.

13. The one or more computer-readable media as recited in claim 11, further comprising computer-executable instructions that, when executed, direct the television entertainment system to verify with the telecommunications system that the mobile telephone identifier is associated with a mobile telephone having a subscription that includes a television entertainment system user authentication service.

14. The one or more computer-readable media as recited in claim 11, further comprising computer-executable instructions that, when executed, direct the television entertainment system to:

receive a television entertainment system command from the mobile telephone via the short-range wireless network; and respond to the television entertainment system command as if the command were received from a television entertainment system remote control device.

15. The one or more computer-readable media as recited in claim 11, further comprising computer-executable instructions that, when executed, direct the television entertainment system to:

detect that a short-range wireless network connection with the mobile telephone has been dropped; and in response to detecting that the short-range wireless network connection with the mobile telephone has been dropped, perform a logout process to automatically logout the user.

16. The one or more computer-readable media as recited in claim 11, further comprising computer-executable instructions that, when executed, direct the television entertainment system to:

receive a transmission from a remote control device associated with the television entertainment system, wherein the remote control device is not a mobile telephone; and in response to receiving the transmission from the remote control device, perform a logout process to automatically logout the user ID.

* * * * *